Patented Oct. 11, 1932

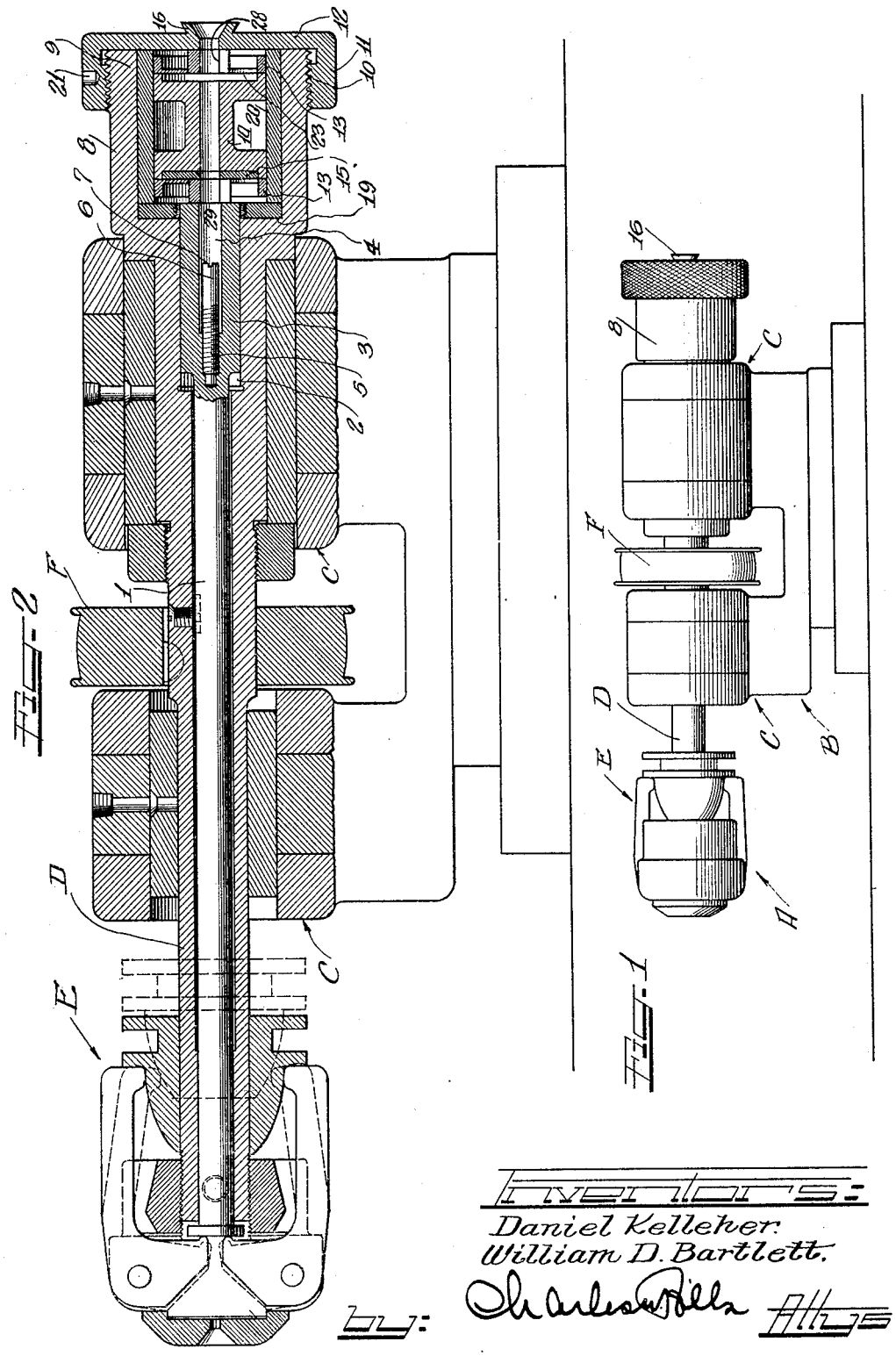

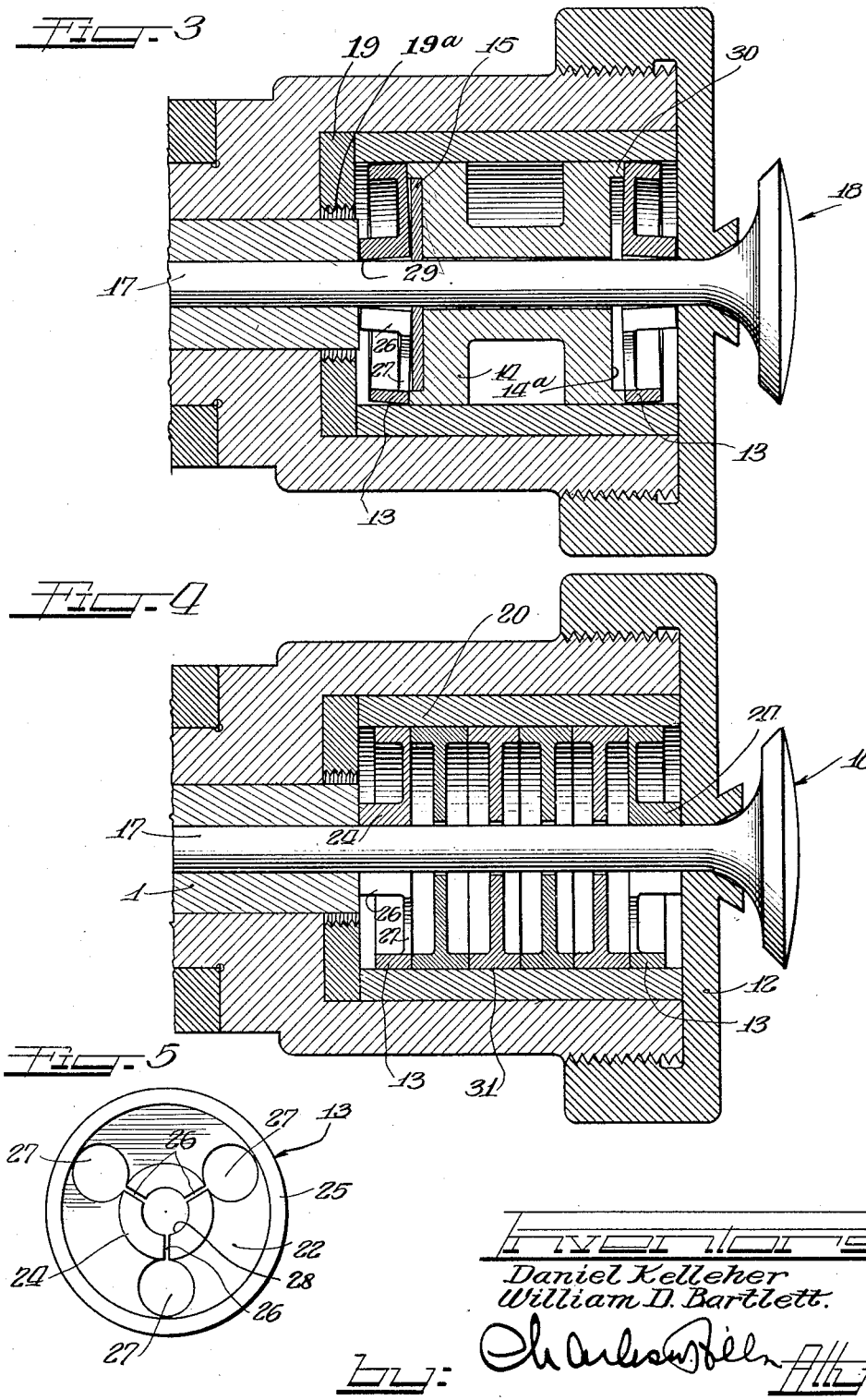

1,881,658

UNITED STATES PATENT OFFICE

DANIEL KELLEHER AND WILLIAM D. BARTLETT, OF CLEVELAND, OHIO, ASSIGNORS TO THOMPSON PRODUCTS, INCORPORATED, OF CLEVELAND, OHIO, A CORPORATION OF OHIO

CHUCK

Application filed October 17, 1930. Serial No. 489,260.

This invention relates to grinding machines of the general character employed in connection with mushroom valves and the like, and concerns itself particularly with a chuck or like device for centering the stem while a grinding operation is performed on the head.

Centering devices of the character described and heretofore in use have proven unsatisfactory for numerous reasons. These have been of the collet type involving the co-engagement of conical surfaces. In actual practice, it has been found that after a surprisingly short period of use, the co-engaging surfaces develop what is known as "high spots", that is, certain portions of the engaging surfaces are subject to more wear than others, with the result that engagement is not uniform and the work is not properly centered. Another drawback, which revolves itself essentially into a corollary of the previous one, resides in the fact that these devices are quite expensive, and because of the early development of "high spots", and the high cost of repairs, must be frequently replaced, thereby resulting in a cost of manufacturing operations per piece of work ground which is well nigh prohibitive.

It is, accordingly, one of the essential objects of this invention to provide a work centering device or chuck which is of simple construction and by reason thereof may be manufactured and assembled at an extremely low cost, which will properly maintain the work in a centered condition over long periods of time, which is not susceptible of the development of "high spots" or other undesirable conditions, and which may be repaired with a minimum of time and labor.

A further object of the invention is to provide a chuck of the character referred to wherein means is provided for engaging the work at a plurality of spaced points to thereby insure a perfect centering of the work and rotation of the latter about the true axis of the chuck.

Another object of no little importance resides in the provision of instrumentalities for adjusting the work engaging means so that the latter may engage the work at desired distances from each other.

Other and further important objects of this invention will be apparent from the disclosures in the specification and the accompanying drawings.

Figure 1 is a view in elevation of a grinding machine embodying our invention.

Figure 2 is an enlarged sectional view, partly in elevation, of Figure 1, illustrating in detail one form of the invention.

Figure 3 is an enlarged fragmentary sectional view, partly in elevation, showing in exaggerated form the manner in which the work engaging and centering members are distorted to tightly grip and center the work.

Figure 4 is an enlarged fragmentary sectional view, partly in elevation, showing the form of the invention wherein a plurality of spacing elements are provided, whereby the work gripping and centering elements may be spaced from each other to various extents corresponding with the requirements of each job.

Figure 5 is a view in elevation of one of the gripping and centering discs employed in our invention.

Referring now particularly to the drawings wherein the same element in each instance is indicated by the same reference character, we indicate in Figure 1, a grinding machine A mounted on a support B provided with bearings C for the grinding machine spindle D, and including the chuck operating and releasing means E and the operating pulley F keyed to said spindle.

In accordance with our invention, the spindle D is hollowed out to receive a plunger 1 and is countersunk at 2 to receive the head 3 of the plunger. The head 3 is hollowed at 4 and is provided with a central threaded opening 5 in which a stop screw 6 is adjustably received. The screw 6 is provided with a kerf 7 adapted to receive a screw driver or the like for adjustment, assembly and disassembly, and the head of said screw is adapted to limit or provide a stop for the stem of the work to be operated upon or ground. The spindle D is further enlarged at 8, the extremity 9 of which is provided with exterior threads 10 for receiving the internally threaded flange 11 of the abutment collar 12, the latter being in abutting engagement with the end 9 of the enlargement 8 of the spindle D, when the chuck instrumentalities are assembled for operation.

The head 3 of the plunger 1 is adapted to project into the enlargement 8, and between the head 3 and the collar 12 are preferably located a pair of resilient discs 13 separated by a flanged spacing element 14 axially recessed at 14a, and one or both of the recesses may receive a shim 15 or the like, the purpose of which will appear as the description proceeds.

The inside diameter of the discs 13 before distortion, the spacer 14, the shim 15, and the collar 12 is substantially the same, preferably, and slightly smaller than that of the opening 4 in the plunger head 3. The collar 12 is provided with a centrally flared portion 16 to facilitate the insertion of the stem 17 of any piece of work such as a valve 18. Tightly received in the enlargement 8, as by a force fit, is a hardened steel member 19 in abutment with the spindle D and having a threaded opening 19a adapted to surround the projecting portion of the head 3 of the plunger 1. A hardened steel sleeve 20 is also received as by a force fit in the enlargement 8 and is adapted for abutment at one end with the member 19 and at the other end with the abutment collar 12, also of hardened steel. The collar 12 is preferably knurled along the outer periphery of the flange 11 and may be further provided with wrench receiving openings 21. The outer peripheries of the flexible discs 13 are flush, and are slidably and snugly received in the sleeves 20. The spacer 14 has preferably a loose sliding fit in said sleeve.

Each of the hardened steel discs 13 is provided with a web 22 which is flat on one side 23, and has substantially cylindrical hub and rim flanges 24 and 25 extending away from the flat side 23. The hub 24 is cut through preferably substantially radially at a plurality of places 26, the web 22 being further cut away at 27 to accentuate the resilient quality of the hub 24, the portions of the hub between the cuts constituting in effect resilient tongues. The hub openings 28 may be normally substantially cylindrical, and the hub is preferably, though not necessarily, of greater length than the flange 25.

It will be appreciated that the thickness of the shim 15 will be slightly less than the depth of each recess 14a of the spacer 14 in which it is received, so that when pressure is applied by the head 3 of the plunger 1 against the projecting portion 28 of the hub 24, sufficient space will be provided between the shim and the flat side of the disc 13 to permit of flexure of the central portion of said flat side toward the shim. It will thus be seen that by varying the thickness of the member 15, the limit of the extent to which the disc 13 can be flexed may be governed or controlled.

It will be appreciated further that the stem gripping and centering discs 13 are in actual practice distorted in the neighborhood of a thousandth or a few thousandths of an inch, but for purposes of illustration the distortion is greatly exaggerated in Figure 3, in order that the action of said discs may be more readily understood. The limiting effect of the member 15 is apparent in this figure, and it will be noted that the disc 13, after it has been distorted, assumes roughly the form of a frustum of a cone, the bases thereof constituting also frusto-conical surfaces. Thus the stem gripping surface of each disc 13 is also slightly conical, a substantial area thereof, adjacent the end 29 of the hub 24, being tightly engaged with the periphery of the stem 17. In view of the fact that the flange 25 of the disc 13 is confined against radially outward expansion by the hardened steel sleeve 20, distortion or flexure of the disc accentuates, to a greater degree than would otherwise be the case, the pressure exerted by the interior surface of the hub 24 on the stem 17. Moreover, the pressure applied to the outer periphery of the flat side of the disc 13 by the flange 30 of the spacer 14 is uniform so that the diameters of the hub openings of the discs 13, after distortion, are the same, and the said openings are truly coaxial. In addition, by reason of the uniformity of the pressure applied to the periphery of each disc 13, the portion of the hub opening which engages the stem 17 grips the latter with uniform pressure.

In the form of the invention shown in Figure 4, the spacing means comprises a plurality of substantially identical spacers 31 fitting slidably within the hardened steel sleeve 20, and, as in the case of the spacer 14 in Figure 3, the end spacers 31 are engageable with annular surfaces of the adjacent discs 13, the hub 24 of said disc being also engageable, whereupon pressure applied in an axial direction toward the collar 12 through the medium of the plunger 1 causes distortion of the discs 13 as shown in exaggerated form in Figure 3. By providing a plurality of spacing elements 31 instead of a single one 14 as in Figure 3, it is possible to vary the distance between the discs 13, as for example, by removing one of the spacers 31, shifting one of the discs to the position thus vacated, and placing a blank, not shown, between the plunger head 3 and the adjacent disc 13.

It will be noted that each spacer 31 has oppositely extending rim flanges as in the case of the spacer 14, and functions likewise either singly or in conjunction with one or more other spacers 31. With this arrangement, the spacing members 31 disposed between the disc 13 will be arranged substantially as shown, so that the outer or rim flanges of the spacers 31 intermediate the discs 13 will have the same effect as the single spacer 14 in Figure 3, namely, that of transmitting thrust directly to the outer peripheries of the discs 13 so that the latter will be subject to exactly the same character of distortion as was true in the arrangement shown in Figure 3. Thus it is possible to space the discs 13 any extent desired, and, it is, therefore, possible with our chuck to accommodate and truly center stems of various lengths.

Another feature of no little importance in connection with our invention resides in the fact that the distortion of the discs may be varied in accordance with a variation in pressure exerted by the plunger 1, so that stems of somewhat varying diameters may be accommodated and centered.

The spindle D including its enlargement 8 may be made of mild steel, the abutment ring 19 and the sleeve 20 being of hardened steel to thereby protect the interior of the enlargement 8 from stresses incident to the distortion of the discs 13. The discs 13 are preferably of hardened steel and are ground centrally and at their outer peripheries within a high degree of accuracy, preferably within five ten thousandths of an inch. The members 19 and 20 engage the interior of the enlargement 8 with a force fit, and the member 19 is interiorly threaded so that when it is desired to remove the same together with the sleeve 20, it is necessary merely to back off the plunger 1, insert a threaded element in the member 19, and exert a sufficient pull on the threaded element to draw the members 19 and 20 out of the enlargement 8, it being understood, of course, that the collar 12 and chuck instrumentalities are initially removed without difficulty.

While we have employed in connection with the instant disclosure discs having a flat side and provided with hub and rim flanges extending away from that side, we consider it well within the province of our invention to employ any shape of disc which will accomplish the desired results.

In this connection it will be noted that while the present description has concerned itself with the clutching of a stem by the hub of a disc, it will be appreciated that the same principles could easily be availed of by an appropriate modification of the disc structure so that the outer periphery of the disc may be employed for gripping the interior of a sleeve-like member.

The outer extremity of the plunger 1 is provided with a head engageable by bell crank levers, the latter being operable by a cam element mounted on the spindle D, the cam element being shiftable by means of a shift fork, not shown, all of which is common in grinding machines of the general character set forth.

It will be appreciated from the foregoing that the clutch discs are extremely simple of construction and manufacture and may be made for a few cents apiece in contra-distinction to the collet type of clutch now in general use, the cost of which is many times that of a disc of the present construction. Moreover, the engagement of the work by the disc is extremely tight and covers an area which is substanially cylindrical, the inclination being in the neighborhood of a thousandth of an inch, so that the development of objectionable "high spots", common in the collet type of chuck, is out of the question. The clutch discs being independent of each other, it is possible to adjust the space therebetween to grip the work at desired points. It is noted, moreover, that the stop screw 6 may be engaged by an elongated screw driver and adjusted thereby without in the least disturbing the clutch instrumentalities.

The clutch discs, being made of hardened steel, are subject to very little wear and it has been found in actual practice that they last very much longer than the collet type of chuck without repair or replacement, and that they may be repaired with an exceedingly small loss of time and low cost, and this is also true of replacement. Moreover, when it is desired for any reason to disassemble the chuck instrumentalities, the operation involved is very simple, since it is necessary merely to remove the collar 12 and insert an element within the chuck to engage the disc and spacer, these parts being slidable out from the sleeve 20. A new chuck unit may be inserted, either of the same size as that replaced, or having grip surfaces of greater or less diameter depending upon the nature of the work to be done. It will be noted also that each disc 13 is capable of extremely long life due to the fact that repair of the same consists only in a regrinding of its grip surface, and should the latter become too large for engagement of a certain size of work, or too small, as the case may be, it may be employed for a piece of work of corresponding size. Thus the discs need not be discarded until no hub remains.

Due to the very light inclination between the gripping surface of the disc hub and the work, the engagement is over a substantial area rather than a line, and undesirable scoring of the stem of the work is thereby obviated.

It is to be understood, of course, that the gripping surface need not necessarily be round, but may be of any desired shape, preferably corresponding with the shape of the work to be engaged and centered.

We are aware that numerous details of construction may be varied through a wide range without departing from the principles of this invention, and we, therefore, do not purpose limiting the patent granted, otherwise than necessitated by the prior art.

We claim as follows:

1. In a chuck, a member having a cylindrical inner face, a plurality of disc-like members having aligned central openings and slits extending radially therefrom, peripheral flanges on said disc-like member contacting the inner wall of said cylindrical member, split hub flanges defining said openings and formed integral with said disc-like members and means for flexing said disc-like members to cause said hub flanges to grip a work piece.

2. In a chuck, a plurality of disc-like members having aligned central openings, hub flanges and peripheral flanges on said disc-like members, each disc-like member having radially extending slits therein passing through one of said flanges, a cylindrical member passing through said hub flanges, a second cylindrical member about the peripheral flanges and means for flexing said disc-like members to cause the split flanges to grip the adjacent cylindrical member.

3. In a chuck, a plurality of flexible metal members having aligned central openings, hub flanges and peripheral flanges on said flexible members, each flexible member having radially extending slits therein passing through one of said flanges, a member passing through said hub flanges, a hollow member about the peripheral flanges and means for flexing said flexible members to cause the split flanges to grip the adjacent member.

4. In a chuck, a pair of disc-like members, a cylindrical member closely encasing said disc-like members, each disc-like member having a central opening with slots extending radially therefrom, a split cylindrical hub in said opening attached to said disc-like member for receiving a cylindrical portion of a work piece, means for exerting axial pressure against said hub, and means cooperating therewith for exerting a counter pressure about the outer periphery of said disc-like member, said means causing said hub to grip the cylindrical portion of said work piece.

5. In a chuck, a member having a cylindrical inner surface, means for positioning a cylindrical portion of a work piece in substantially co-axial relation within said cylindrical inner surface, spaced disc-like members having inner segmental cylindrical peripheral surfaces conforming with and closely adjacent to said cylindrical portion of the work piece and having outer continuous cylindrical surfaces flexibly connected to said inner peripheral surfaces and conforming with and closely adjacent to said inner surface and means for exerting a force against the inner periphery of said disc-like member, and means cooperating therewith to repel said force at the outer periphery of said disc-like member to cause diaphragmatic distortion thereof and thereby cause said inner segmental peripheral surfaces to more tightly grip said cylindrical portion of the work piece.

6. In a chuck, a member having a cylindrical inner surface, means for positioning a cylindrical portion of a work piece in substantially coaxial relation within said cylindrical inner surface, spaced disc-like members having inner segmental cylindrical peripheral surfaces conforming with and closely adjacent to said cylindrical portion of the work piece and having outer continuous cylindrical surfaces flexibly connected to said inner peripheral surfaces and conforming with and closely adjacent to said cylindrical inner surface and means for exerting oppositely directed lateral pressure against the inner and outer peripheries respectively of said disc-like members to cause diaphragmatic distortion thereof and thereby cause said inner segmental peripheral surfaces to more tightly grip said cylindrical portion of the work piece.

7. In a chuck, a pair of disc-like members, a cylindrical member encasing said disc-like members, a spacing member in said cylindrical member between said disc-like members and having peripheral flanges at each end thereof abutting said disc-like members, each disc-like member having a central opening with slits extending radially therefrom, a split hub flange, defining said opening, for receiving a cylindrical portion of a work piece, means for exerting axial pressure against said hub flange, said means and said flanged spacer causing said disc-like members to distort diaphragmatically to thereby cause said hubs to grip the cylindrical portion of said work piece.

8. In a chuck, a cylindrical housing, a hollow cylindrical member fitting said housing, a plurality of disc-like members having continuous outer peripheral flanges closely contacting the inner surface of said cylindrical member, said disc-like members having aligned central openings, and slits extending radially therefrom, split hub flanges defining said openings, integral with said disc-like members, for receiving a cylindrical portion of a work piece, means for exerting axial pressure against said hub flanges and means in said housing cooperating with said first means for exerting opposite pressure against the outer peripheral flanges of said disc-like members to distort said hub flange members to cause them to grip the cylindrical portion of said work piece.

9. In a chuck, a cylindrical housing, a hollow cylindrical member fitting in said housing, a pair of disc-like members having continuous outer peripheral flanges closely contacting the inner surface of said cylindrical member, said disc-like members having aligned central openings, slits extending radially therefrom and split hub flanges defining said openings, receiving a cylindrical portion of a work piece, a spacing element in said hollow cylindrical member between said disc-like members, said spacing element having outer peripheral flanges contacting said disc-like members and means for exerting axial pressure on said hub flanges to flex said disc-like members and thereby cause said hub flanges to grip said work piece.

10. In a chuck, a cylindrical housing, a hollow cylindrical member fitting in said housing, a pair of disc-like members having continuous outer peripheral flanges closely contacting the inner surface of said cylindrical member, said disc-like members having aligned central openings, slits extending radially therefrom and split hub flanges, defining said openings, for receiving a cylindrical portion of a work piece, a plurality of spacing elements in said hollow cylindrical member between said disc-like members, said spacing elements having outer peripheral flanges certain of which contact said disc-like members and means cooperating with said spacing elements for flexing said disc-like members to thereby cause said hub flanges to grip said work piece.

11. In a chuck, a housing having a cylindrical recess therein terminating in an end shoulder, a hollow cylindrical member fitting in said housing against said shoulder, a pair of disc-like members having continuous outer peripheral flanges closely contacting the inner surface of said cylindrical member, said disc-like members having aligned central openings, slits extending radially therefrom and split hub flanges defining said openings, for receiving a cylindrical portion of a work piece, a spacing element in said hollow cylindrical member having outer peripheral flanges contacting said disc-like members, an end collar on said housing contacting one of said hub flanges and having an opening aligned with the openings in said disc-like members, and means for exerting pressure against said hub flanges, said means cooperating with said spacing elements and said end collar to flex said disc-like members and thereby cause said hub flanges to grip said work piece.

12. In a chuck, a spindle having a central opening therethrough and an enlarged recess at one end thereof, a hollow cylindrical member fitted into said recess, a plurality of disc-like members having continuous peripheral flanges contacting the inner surface of said cylindrical member, said disc-like members having aligned central openings and slits extending radially therefrom, split hub flanges integral with said disc-like member and defining the openings for receiving a portion of a work piece, a spacing element in said hollow cylindrical member having outer peripheral flanges contacting said disc-like members, an abutment collar mounted on the recessed end of said spindle contacting one of the hub flanges and having a central opening aligned with the openings in said disc-like members and a shaft in the central opening of said spindle movable therein for exerting pressure on said hub flanges and cooperating with said spacing element and said abutment collar to flex said disc-like member, and thereby cause said hub flanges to grip said work piece.

13. In a chuck, a rotating spindle having a central opening therethrough and an enlarged recess at one end thereof, a hollow cylindrical member fitted into said recess, a plurality of disc-like members having continuous peripheral flanges contacting the inner surface of said cylindrical member, said disc-like members having aligned central openings and slits extending radially therefrom, split hub flanges integral with said disc-like member and defining the openings for receiving a portion of a work piece, a spacing element in said hollow cylindrical member having outer peripheral flanges contacting disc-like members, an abutment collar mounted on the recessed end of said spindle contacting one of the hub flanges and having a central opening aligned with the openings in said disc-like members and a shaft in the central opening of said spindle movable therein for exerting pressure on said hub flanges and cooperating with said spacing element and said abutment collar to flex said disc-like members and thereby cause said hub flanges to grip said work piece.

14. In a chuck, a plurality of disc-like members having aligned perimeters and central openings, hub flanges and peripheral flanges on said disc-like members, each disc-like member having radially extending slits therein passing through one of said flanges, a cylindrical member passing through said hub flanges, a second cylindrical member enveloping the peripheral flanges, one of said cylindrical members forming the driving and centering means for the chuck and the other of said cylindrical members forming the element to be held by the chuck and being the one associated with the split flange of the disc-like member, and means for flexing said disc-like members to cause the split flanges to grip the adjacent cylindrical member.

In testimony whereof we have hereunto subscribed our names at Cleveland, Cuyahoga County, Ohio.

DANIEL KELLEHER.
WILLIAM D. BARTLETT.